Jan. 9, 1945.  A. O. PAYNE  2,367,138
FILLING SPOUT
Filed July 15, 1942   2 Sheets-Sheet 1
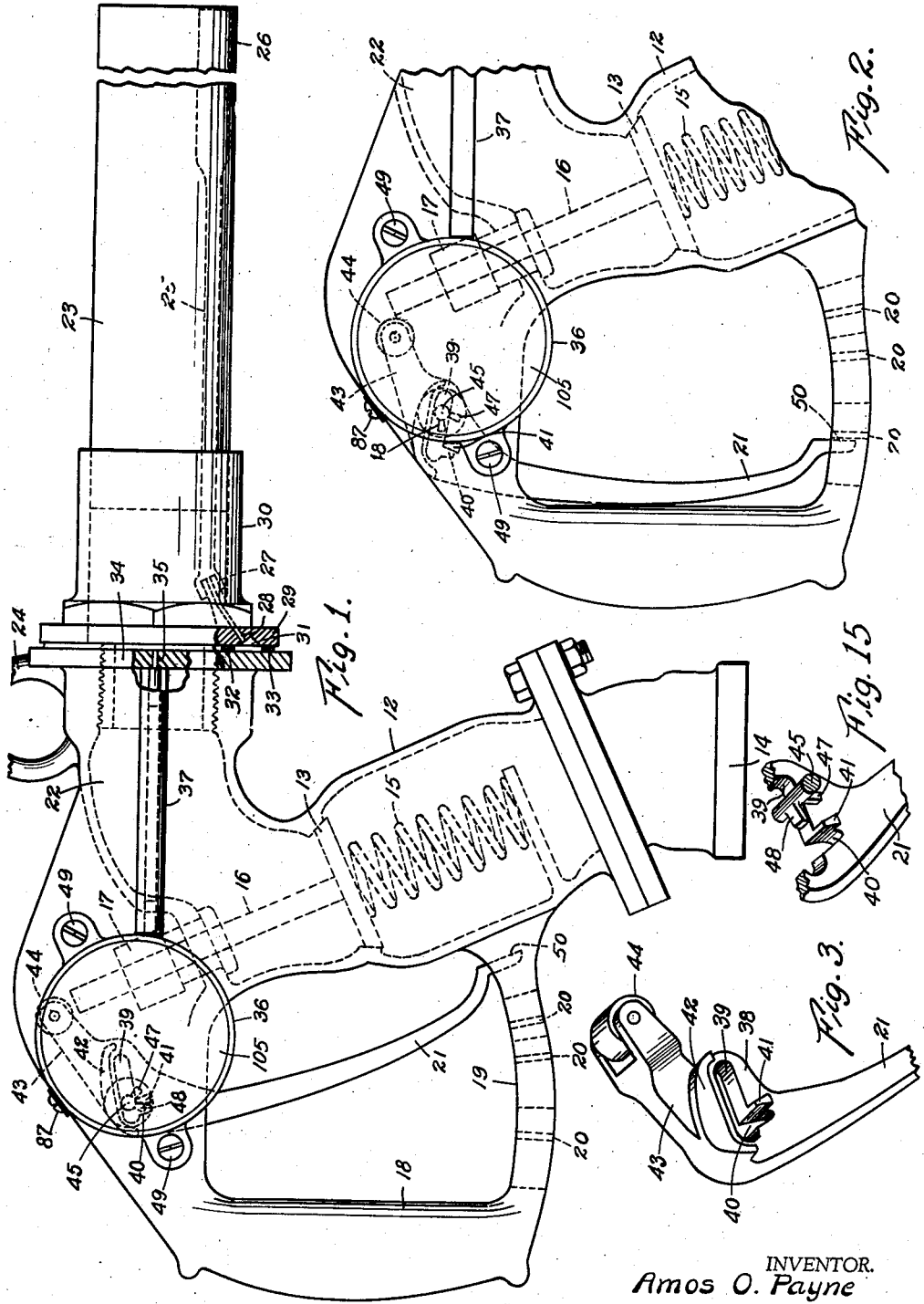
INVENTOR.
Amos O. Payne
BY
Zugelter, Kinney + Zugelter
Attys.

Jan. 9, 1945. A. O. PAYNE 2,367,138
FILLING SPOUT
Filed July 15, 1942 2 Sheets-Sheet 2
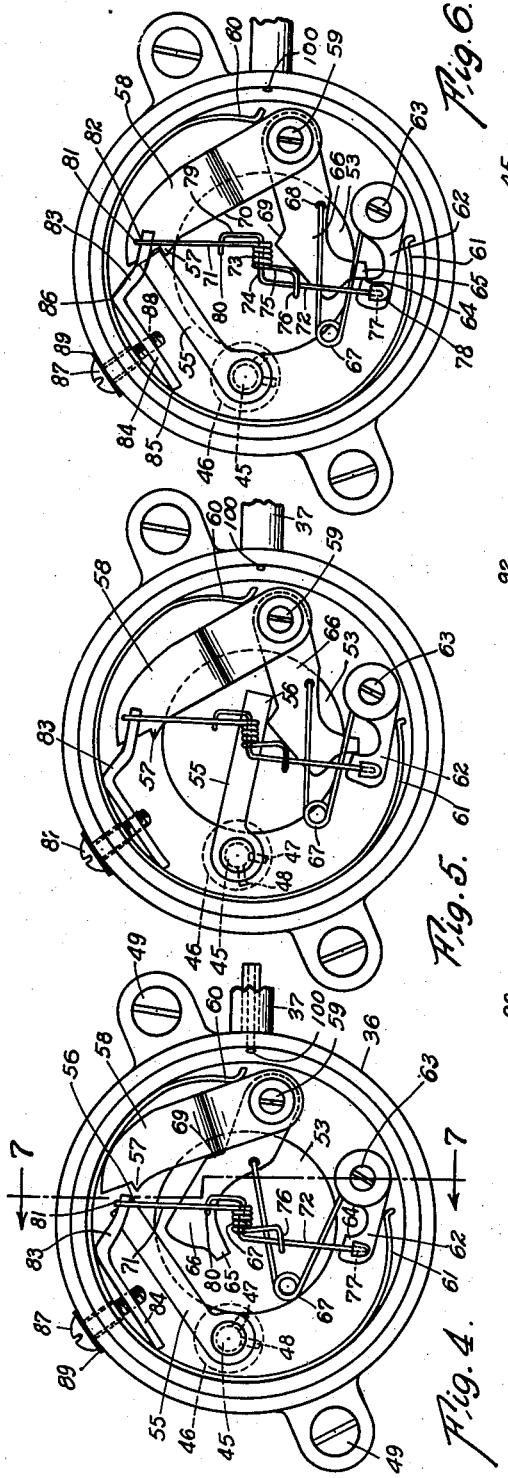
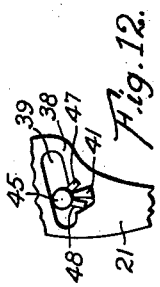
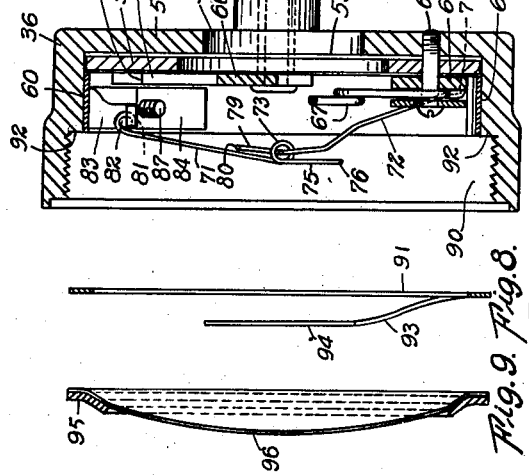
INVENTOR.
Amos O. Payne Patented Jan. 9, 1945

2,367,138

UNITED STATES PATENT OFFICE 2,367,138

FILLING SPOUT

Amos O. Payne, Cincinnati, Ohio, assignor to The Ohio Pattern Works and Foundry Company, Cincinnati, Ohio, a corporation of Ohio Application July 15, 1942, Serial No. 451,031

20 Claims. (Cl. 226—127)

This invention relates to a filling spout such as may be employed in the filling of tanks or receptacles with liquids from a source of supply.

One of the objects of the invention is to provide a filling spout with improved automatic means for terminating the flow of a liquid therethrough, as the level of liquid in the receptacle being filled reaches a predetermined level.

Another object of the invention is to provide a filling spout of the character stated, in which the automatic flow cut-off mechanism is very sensitive to pressures that are intended to normally operate it, but which is unresponsive to accidental jarring or impacts usually resulting from normal handling of the filling spout in use.

Another object of the invention is to provide a filling spout of the kind referred to, which combines in its mechanical construction great sensitivity to minute actuating pressures, and at the same time a ruggedness and durability such that it will withstand the severe treatment and service incident to its use by the armed forces.

A further object is to provide an automatic filling spout having its operating parts so designed and arranged that dropping the device bodily from considerable elevations, such as from the wings of large aircraft undergoing servicing, will not result in displacement or distortion of parts to render the device inoperative.

Other objects of the invention are to provide a device of the character stated, which will avoid waste of fluid being dispensed thereby; to promote safety when the fluid dispensed is inflammable or explosive in character; to save the time and effort of an attendant charged with the duty of filling tanks or receptacles to a predetermined level; to ensure positive and reliable action of an automatic flow cut-off mechanism incorporated in the filling spout; to provide for simple and expeditious adjustment of the cut-off mechanism; and to attain various other objects and advantages that will become self-evident as the detailed description of the invention proceeds.

In the accompanying drawings:

Fig. 1 is a plan view, parts being broken away, illustrating the improved filling spout of the invention.

Fig. 2 is a fragmental plan view showing the left end of the Fig. 1 device, with certain parts in an inoperative position.

Fig. 3 is a fragmental detail view showing an actuating lever.

Fig. 4 is a plan view of a housing, with covering elements removed, showing part of the automatic cut-off mechanism in the inoperative position.

Fig. 5 is a view similar to Fig. 4, showing the cut-off mechanism undergoing setting, or cocking.

Fig. 6 is a view similar to Figs. 4 and 5, showing the cut-off mechanism cocked, and ready to be tripped.

Fig. 7 is an enlarged cross-sectional view taken on line 7—7 of Fig. 4, with the various covering parts for the housing removed.

Figs. 8, 9, 10 and 11 are cross-sectional views of the covering parts, namely, a leaf spring element, a diaphragm element, a clamping ring, and a cap, respectively, of the cut-off mechanism, said parts being applicable to the housing in the order shown.

Fig. 12 is a detail view showing the actuating lever with the lug 41 thereof coacting with the teeth 47 and 48 of shaft 45 to provide a fulcrum for the lever, as in Fig. 1.

Fig. 13 is a view similar to Fig. 12, showing the lever depressed to open a valve such as 13 of Fig. 1, the shaft 45 being locked against rotation as in Fig. 12.

Fig. 14 is a view similar to Figs. 12 and 13, showing the lever displaced as when the shaft 45 rotates slightly with attendant loss of its fulcruming function, see Fig. 2.

Fig. 15 is a fragmental detail view similar to Fig. 3, indicating the relative positions of parts as seen in Fig. 14.

The device of the present invention has been designed primarily for the purpose of transferring or dispensing liquids from a source of supply to a receptacle or tank. Included in the device is a means or mechanism for automatically terminating the flow of liquid when the level of liquid in the receptacle or tank being supplied reaches a predetermined elevation. Accordingly, the device is useful for filling fuel tanks, and oil and water reservoirs of vehicles, aircraft, vessels, and machines of various types, as well as for any other purpose involving transfer of liquids from a source of supply to a receptacle.

Various attempts have been made in the past, to furnish a filling device capable of automatically terminating the flow of a liquid into a receptacle, upon bringing the level of liquid to a predetermined elevation within the receptacle. The prior devices were not necessarily inoperative, or incapable of performing their intended function, but they were erratic and not entirely dependable in their operation. Some were known to fail at times, thereby rendering the devices unreliable and therefore needful of more or less constant supervision. Others, made to overcome the unreliability mentioned, were found to trip and close the flow valve prematurely, which was a source of annoyance resulting in unreliability because of a tendency of the automatic mechanism to trip in response to accidental jarring or impacts upon the filling spout which were not intended to trip it. For example, some of the prior devices after insertion into the filling opening of an aircraft fuel tank, would trip by reason of such shocks as would be transmitted to the filling devices by reason of an attendant walking on the wing surfaces, or closing a cabin door. In many instances the prior devices would be tripped by the mere careless insertion of the delivery tube or nozzle into the fuel tank opening. In view of the many accidental ways in which it was possible to prematurely trip those prior devices which were sensitive enough to reliably operate by fluid level increases, such devices were generally considered a nuisance and were used only in isolated circumstances comparatively free of accidental shocks or impacts. The objections noted were responsible for materially limiting the use of automatic filling spouts.

With the haste and sometimes unfavorable conditions under which aircraft, vessels, and military land vehicles must be refueled in wartime, an urgent need has arisen for an automatic filler spout that may be relied upon to terminate the flow of fuel at a proper time, while the attendant is busy with other servicing duties. To satisfy that need, by eliminating all of the shortcomings of the prior filling devices, is one of the primary objects of the present invention. The novel and improved means whereby the various disadvantages have been overcome, are explained in the following detailed specification, and illustrated in the accompanying drawings which constitute part of the present disclosure.

With reference to Fig. 1, 12 indicates the body of the device, within which is disposed a suitable valve 13 for the control of liquids entering the valve body through the port 14 from a hose. The valve may be of any acceptable type, and would preferably be equipped with a dashpot or other means preventing hammering incident to sudden closing movements. For the purpose of the present invention, it will suffice to show the rather conventional valve 13 which is normally kept upon its seat by means of a spring 15.

The valve has a stem 16 which extends upwardly through a suitable packing box 17 in any well-known manner, to avoid leakage about the stem.

A portion of the valve body is developed into a handle 18, the connecting portion 19 thereof being preferably, though not necessarily, provided with a series of stop notches or steps 20 for holding a valve actuating lever 21 in any one of several open valve positions. Liquid passing the valve 13 enters the discharge passage 22 of the valve body and is directed by way of a delivery tube 23, to the receptacle or tank to be supplied with liquid. The character 24 indicates a lifting ring upon the valve body.

Within the delivery tube there is disposed an air tube 25 having preferably an enlarged end 26 terminating near the mouth of the delivery tube, and this air tube extends rearwardly to a location 27 where it connects with an air passage 28 formed in the flange 29 of the delivery tube connector 30. The flange is annularly grooved as at 31, and at the opposite bounding edges of the groove the gaskets 32 and 33 are provided for the purpose of confining air that may be compressed within the air tube 25 as a level of liquid enters the air tube at the end portion 26 while the delivery tube is projected downwardly through an opening in the tank or receptacle being filled with liquid.

At one side of the valve body, and preferably within a flange 34 thereof, a small air passage 35 is provided, this air passage being in communication with the space between the gaskets 32 and 33, in order that air compressed within the air tube 25 may pass about the annular groove 31 and through the passage 35, whence said air will be led to the interior of a housing 36, by way of an air tube extension 37. Although the air tube extension may be of any desired form, a satisfactory arrangement may be had by utilizing a flexible rubber hose as an air tube extension. The primary air tube 25 may conveniently be constructed of metal or any non-metallic substance which is quite rigid and not likely to collapse. The function of the air tube structure will be explained hereinafter.

The actuating lever 21, as may best be understood by referring to Fig. 3, includes a pivotal mounting portion 38 provided with an elongated slot 39 which normally extends in the general direction of the delivery tube axis. In those instances in which the delivery tube and the air tube 25 may be constructed of flexible hose material, it may better be stated that the elongated slot 39 of the actuating lever extends in the general direction of the axis of the delivery tube connector 30, which is a rigid element.

Referring back to Fig. 3, it will be noted that the rear end of the elongated slot 39 is provided with a downwardly extended tooth socket or notch 40, adjacent to which there is provided a lateral extending stationary lug 41 whose axis is substantially perpendicular to the major axis of the elongated slot. The lug 41 may have one of its working faces coplanar with a working face of the socket or notch 40. The lug 41 may be overhung by a spacing boss 42 made integral with the material of the lever, and extended laterally along one edge of the elongated slot in overlying relationship to the lug 41. From the region of the boss 42, an arm 43 of the actuating lever extends forwardly approximately at right angles to the lever proper, and upon the free end of said arm there is provided a contactor 44 which, if desired, may be in the form of a roller as shown, or merely in the form of an abutment or head capable of contacting and depressing the valve stem in opposition to the force of spring 15. For achieving the smoothest possible action of the actuating lever, it is considered desirable to furnish it with the rotatable head or roller 44.

Instead of pivotally mounting the actuating lever upon a conventional pivot, the present invention contemplates supporting the lever upon the main shaft 45 of an automatic flow cut-off mechanism, part of which is contained within the protective housing 36. The main shaft 45, when not locked against rotation, has limited rotational movement within a stationary boss 46 on the rear of the housing 36, and laterally from said shaft there extends a pair of teeth indicated by the characters 47 and 48. These teeth 47 and 48, as may be observed by referring to Figs. 1 and 12, engage, respectively, the lug 41 and the notch 40 of the actuating lever, under normal conditions at which the actuating lever is released while the valve is seated. Although the main shaft 45 of the cut-off mechanism is rotatable to a limited extent, the location of its axis is fixed by reason of the fact that the housing boss or bearing 46 is integral with the housing itself, which latter is fixed to the side of the valve body by means of screws or otherwise, as indicated at 49—49. Thus, it will be understood that the actuating lever 21 may have bodily shifting movement toward and from the valve stem, within limits determined by the length of slot 39, whenever shaft 45 is not locked against rotation. Moreover, as indicated by Fig. 2, such bodily movements of the actuating lever 21 will result in displacing the teeth 47 and 48 from their engagement with the lug 41 and the socket 40, thereby enforcing a partial rotation of the cut-off mechanism shaft 45 in clockwise direction. Whenever the actuating lever 21 is returned from the Fig. 2 position to the position indicated by Fig. 1, the lug 41 engaging with the tooth 47 will rotate the shaft 45 in counterclockwise direction, to the extent of returning the tooth 48 of the shaft to the notch 40 of the actuating lever. This partial movement of the shaft 45 incident to bodily shifting of the actuating lever, results in a locking of shaft 45 in the Fig. 12 position, as will be explained, to provide a fixed fulcrum for the lever action illustrated by Fig. 13. Attention may be directed to the fact that the actuating lever has a lower end 50 which may be latched against any one of the lateral steps 20 provided on the handle portion 19, by merely imparting a slight lateral motion to the lever as it is pulled back for opening the valve 13. The width of the elongated slot 39 is sufficient to permit the slight lateral movement of the actuating lever necessary to effect engagement of the lever end 50 with the various steps or notches 20. This is the only purpose for the slight lateral movement of the lever, and it has no effect whatever upon the fulcrum action occurring at shaft 45. When shaft 45 is locked against rotation, lever 21 fulcrums upon lug 41, as shown by Figs. 12 and 13. When shaft 45 is not so locked, the condition at Fig. 14 obtains, due to displacement of tooth 48 from notch 40 upon slight rotation of the unlocked shaft. This is explained more fully in the statement of operation hereinafter presented.

As to the structure contained within the housing 36, reference may be had to Figs. 4 and 7, from which have been omitted the covering parts illustrated by Figs. 8, 9, 10 and 11. The flat rear wall or base 51 of the housing preferably is apertured at 52, the aperture being spanned by a flexible diaphragm 53 of leather or other inert material. The flat ring 54, likewise apertured as shown, serves to clamp the diaphragm in position over the aperture 52.

The main shaft 45 extends through the bearing element 46 and rear wall 51, and to the inner end of said shaft is fixedly mounted a trip bar or lever 55 having a free end 56. The trip bar 55 preferably is flat, and moves in a plane parallel to the rear wall 51 of the housing whenever main shaft 45 is rotated. By comparing Figs. 4 and 5, it will be observed that the trip bar 55 and shaft 45 move through an arc approximating 35 degrees. The amount of arcuate movement is not critical, but will preferably be less than 90 degrees in order to preclude making the housing 36 of large proportions.

The free end 56 of the trip bar or lever is adapted to abut, and be held in its elevated position of Fig. 6, by a catch or projection 57 of a pivoted trip bar latch 58. The latch 58 is mounted upon the housing wall or base 51 at the location 59, and is yieldingly urged into latching position against the trip bar, by a suitable spring 60. The spring as shown, may be in the form of a leaf spring seated about the interior of the housing, and extending a substantial distance around in order to furnish a second yielding end 61. The end 61 of the spring serves to yieldingly elevate a hammer latch or sear 62 having at 63 a pivotal mounting upon the housing rear wall. The sear is provided with a corner or abutment 64 adapted to engage the extension 65 of a hammer member 66. The hammer member may be pivoted upon the same screw or stud that pivots the trip latch 58, as indicated at 59.

By the force of a coiled spring 67, having ends anchored at 63 and 68, the hammer member may strike the trip bar latch 58 and dislodge the abutment 57 thereof from holding relationship with the trip bar 55, thereby permitting rotation of the trip bar shaft 45 to the Fig. 5 position. The striking surface of the hammer member is indicated at 69, and will be understood to strike the latch member 58 at the approximate location indicated at 70. It may be noted, incidentally, that the trip bar latch 58 is offset slightly near the point 70, to dispose the free end and the abutment 57 in coplanar relationship with the trip bar 55 and the parts indicated at 66 and 62.

From the foregoing, it will be readily understood, that slight displacement of the sear 62 downwardly in opposition to the force of spring 61, will release the hammer element 66, and the latter, by the action of spring 67, will be caused to strike the latch element 58 for releasing the trip bar 55, in order that the trip bar may move downwardly to the Fig. 5 position.

The means for displacing the sear or hammer latch 62 may comprise a toggle structure which preferably is made of piano wire. The toggle may comprise the two wire parts 71 and 72, the part 71 being coiled spirally at 73 to form a bearing in which may be received the laterally extending portion 74 of the toggle part 72. Beyond the spiral formation, the wire constituting the toggle part 71 is extended outwardly as at 75, and is then bent substantially at right angles to form a stop or abutment 76 overlying the shank of the other toggle part 72.

The toggle part 72 has an anchor end 77 loosely received in a socket 78 carried by the sear, the socket interior being sufficiently large and smooth to avoid any binding or frictional resistance to slight movements of the anchor end 77. At the spiral bearing 73 of toggle part 71, the transverse portion 74 of toggle wire 72 enters the spiral portion to form the toggle pivot, and after leaving the spiral portion the wire 72 is extended for a distance in substantial parallelism with the wire 72, as at 79, whence the wire end is turned as at 80 to underlie the wire 71.

By referring to Fig. 7, it will become evident that the turned end 80 of toggle element 72 provides a stop or abutment limiting outward movement or breaking of the toggle, while the turned end 76 of toggle element 71 provides a stop or abutment limiting the inward or straightening movement of the toggle structure. It should be noted that the outermost end 81 of toggle element 71 has a loose pivotal connection at 82 upon a normally stationary anchor 83 fastened to the housing 36. This anchor member may be adjustable toward and from the center of the housing for the purpose of adjusting the toggle, and thereby establishing the extent of movement to be imparted to the sear 62 in order to release the hammer 66. A simple adjustment for the anchor 83 consists in making the anchor of substantially L shape, with the base portion 84 thereof spanning a sector of the cylindrical housing wall, so that the base may make contact at the points 85 and 86. By projecting an adjusting screw 87 through the side wall of the housing, and making threaded connection with the anchor base at the point 88, the anchor base may be flexed as the screw is rotated, to adjust the anchorage point 82 radially inwardly and outwardly relative to the center point of the housing. In this manner the toggle may be adjusted for varying the sensitivity of the latching action between the sear and the hammer, at the location 64—65. It is to be understood that the toggle adjusting means just described furnishes no interference with the movements of the trip bar 55 and the trip bar latch 58. Any suitable means such as a washer or gland 89 may be associated with the adjusting screw to prevent leakage of air past the screw. Similar precautions are to be observed for precluding air leakage from the interior of the housing 36, where shaft 45 and the various pivots 59 and 63 are mounted upon the housing.

As will be observed by referring to Fig. 4, the hammer spring 67 is sufficiently strong to overcome the force of spring 60 when the hammer is in contact with the trip bar latch 58, so that when the parts are disposed in the Fig. 4 position, the catch 57 will not interfere with movement of the trip bar or lever 55 toward and against the hammer element 67, in performance of its function of cocking the hammer. The cocking of the hammer by the trip bar 55 is clearly illustrated by Fig. 5, and it will be observed that subsequent movement of the trip bar or lever to the Fig. 6 position removes the force of the hammer from the latch 58 in order that the latch spring 60 may function to yieldingly urge said latch 58 inwardly and into the path of movement of the trip bar, for subsequent latching thereof at the point 57.

The mechanism within the housing is to be sealed in by means of the cover parts of Figs. 8 to 11, inclusive, inserted into the internally threaded chamber 90 in the order in which said parts appear at the left of Fig. 7. The part 91 is an annular ring adapted to seat upon the annular shoulder 92 of the housing, and toward the center of said ring extends a resilient arm 93 which may terminate in a disc-shaped enlargement 94. When this element is placed in position, the yieldingly supported portion 94 closely overlies the toggle portion 75—76, and may at times contact the latter, for releasing the hammer 66 as was explained previously in describing Fig. 6. Normally, however, the toggle is free of contact with the yielding means 94.

Upon the annular member 91 is then placed a ring-shaped diaphragm frame 95 which carries a thin flexible diaphragm 96 of leather or other suitable material, and which is substantially impervious to air and moisture. A clamping ring 97 having external screw threads 98 is then screwed into the correspondingly threaded chamber 90 of the housing, to securely clamp the parts 91 and 95 in position therein. The clamping ring may carry a circumferential gasket or washer 99 against which a cap 105 may bear for establishing an air-tight chamber between the cap and the diaphragm 96. The cap may be internally threaded to screw onto the threads of the clamping ring, or may be in any other manner held tightly in place upon the housing 36, as desired.

The air-tight chamber between the cap and diaphragm 96 is in communication with the air tube extension 37 through a small opening shown at 100 in Figs. 4, 5 and 6, such opening being preferably a drilled hole in the housing 36 located slightly outwardly of the seat flange 92 so as to be wholly within the outer air-tight chamber 90. When the cap and all of the intermediate parts of Figs. 8, 9 and 10 are secured in place upon the housing, the entry of air under slight pressure through the opening 100 is capable of forcing the diaphragm 96 against the yielding part 94, which in turn will contact the toggle at 76 to displace the sear and release the hammer 66. When the chamber 90 contains air under atmospheric pressure, the yielding spring metal part 94 will keep the diaphragm slightly bulged into the chamber 90, and will be free of contact with the toggle.

The diaphragm 96 and the spring metal part or contactor 94 are of such light weight as to have no appreciable inertia in the event that the housing or any part of the device be subjected to impact or jarring, and for that reason the automatic mechanism will not trip accidentally even though the device be subjected to considerable abuse. The inertia of the toggle constituents also has been reduced to a minimum, by utilizing piano wire in its construction. These features of construction are important to the practicability of operation of the improved filler spout of the invention, as are also the triple latch structure and the bodily shiftable actuating lever arrangement whereby the flow valve is automatically controlled. Further explanation of these elements is given in the following summation.

The operation of the device is as follows:

In the normally inoperative condition of the filler spout, the valve 13 will be closed as illustrated by Fig. 1, and the actuating lever 21 may assume the position therein shown, with the trip shaft 45 at the limit of its counterclockwise rotation. The tooth 48 may be within the socket 40, while the tooth 47 rests against the forward face of the stationary lug 41 of the actuating lever. It will be noted that the roller 44 is not in depressing relationship with the valve stem 16. In this condition of the actuating lever, the various constituents of the automatic shut-off assembly may assume the relative positions illustrated by Fig. 4, wherein the trip bar 55 is elevated to its upper limit of travel, while the hammer 66 holds the trip bar latch 58 out of latching engagement with the trip bar.

By pulling back the actuating lever to the Fig. 2 position, the tooth 48 of the main shaft may be caused to leave the socket 40 and to ride along the elongated slot 39, thereby resulting in a clockwise rotation of the main shaft 45, to cock the automatic trip mechanism as illustrated by Fig. 5. At this point in the explanation, it may be noted that the bodily shifting movement of the actuating lever to the Fig. 2 position, has caused the roller 44 to ride rearwardly and off the top of the valve stem, so that the valve stem has not been depressed to open the valve 13. The stated action of the actuating lever, as will be observed from Fig. 5, has imparted rotation of the main shaft 45 to the trip bar 55, the hammer 66 having been thereby depressed by the trip bar so as to engage the sear 62. At the same time, spring 60 has acted to slightly advance the latch element 58 to the left, so that it will be in the path of a subsequent upward pivotal movement of trip bar 55.

As the operator releases his hold upon the actuating lever 21 so that the lever may return to the Fig. 1 position, the tooth 47 (Fig. 1), of shaft 45, will strike the stationary lug 41 of the actuating lever and enforce a partial counterclockwise rotation of main shaft 45 until the tooth 48 of said shaft reenters the socket 40 of the actuating lever. This action places the roller 44 directly above the valve stem, and results in the cooperative relationship of the trip assembly constituents illustrated by Fig. 6. It will be noted that Fig. 6 shows the hammer 66 in cocked relationship to the sear 62, with the spring 67 under strain. The trip bar latch 58 will be found in latching engagement with the trip bar 55 at the point 57, so that the trip bar may not rotate to the Fig. 5 position upon the subsequent movement of the actuating lever to the Fig. 2 position. With the trip bar thus incapable of clockwise rotation, and the main shaft similarly restrained by reason of the fact that said shaft is fixed to the trip bar, the shaft and its teeth will be found to assume once more the relationship illustrated by Fig. 1. If, then, the actuating handle 21 of Fig. 1 be subsequently pulled back toward the handle 18, with shaft 45 unable to rotate, the tooth 48 of the main shaft will of necessity remain within the socket 40 of the actuating lever, and provide a fixed fulcrum about which the actuating lever will rotate while the roller 44 depresses the valve stem 16 to the open valve position. The end 50 of the actuating lever 21 may thereupon be latched behind one of the steps or stops 20 carried by the handle portion 19, for holding the lever in the open valve condition. A liquid entering the intake port 14 by way of a hose or tube attached thereto will thereupon pass the valve and be continuously delivered from the free open end of delivery tube 23. Under ordinary circumstances, the delivery tube will be directed downwardly into a tank or reservoir to be filled with liquid.

As the filler spout thereby delivers liquid to a tank, the toggle structure 71—72 will be arched outwardly as illustrated by Fig. 7, and free of contact with the center portion 94 of spring member 91, so that the sear will remain in cocked engagement with the hammer 66 of Fig. 6. The outward limit of movement of the toggle will be established at the point 80 of Fig. 7, as was previously explained. We now have the liquid flowing past the valve, through the delivery tube 23, and into a tank or reservoir to be filled.

With the parts conditioned as above explained, for ensuring continuous delivery of liquid from the tube 23, the operator may leave the filler spout and attend to other duties, with the assurance that the automatic mechanism of the invention will trip and close the supply valve when the level of liquid in the tank or reservoir reaches a predetermined level upon the delivery tube.

The automatic tripping of the valve to closed position occurs by reason of the fact that the level of liquid will reach the open end of the delivery tube 23, and in rising further it will entrap and compress the air within the air tube 25. By reason of the connections at 27—28—31—35—37—100 (for the last numeral see Fig. 6), the air under compression will bear against the convex surface of the flexible diaphragm 96 and will move the spring element 94 into contact with the end 76 of the toggle (Figs. 7, 8 and 9). The resultant straightening movement of the toggle will act to displace the sear 62 of Fig. 6 downwardly, against the force of the light spring 61, until the hammer 66 is released and is permitted to respond to the force of its spring 67, for striking a sharp blow against the trip bar latch 58 at the location 70. The force of the hammer blow will be sufficient to remove the trip latch 58 from its engagement with the trip bar 55, at point 57, whereupon the trip bar will immediately descend to the Fig. 5 position, to recock the hammer element. It may here be noted that the descending movement of the trip bar as above explained, necessarily resulted in a partial clockwise rotation of the main shaft 45, sufficient to remove the tooth 48 from the notch 40 (Fig. 1), thereby allowing the force of the supply valve spring 15 to force the roller 44 rearwardly out of the path of axial movement of the valve stem. With the lever roller 44 thereby displaced, the main valve 13 will be closed by its closing spring 15.

The closing action of the main valve may or may not dislodge the lower end 50 of the actuating lever from the step or notch 20 by which it had been restrained previously. If said lower end of the actuating lever does not leave its step or notch 20, the tripped condition of the parts will be as illustrated by Fig. 2. This is also the position the lever will assume after tripping when held manually by the operator. The safety feature is, that regardless of how firmly the lever 21 may be held against the handle 18, disengagement of the lever from stem 16 is positive at the instant of automatic tripping. For operating convenience, if lever 21 is retained against handle 18 until the delivery tube 23 is completely withdrawn from the liquid, cocking for subsequent operation is automatically completed. If, however, lower end 50 is permitted to drop to its initial position of Fig. 1 while the delivery tube 23 is still immersed in the liquid, air pressure on diaphragm 96 (Fig. 9) will force toggle elements 71—72 to hold sear 62 out of engagement with the hammer 66. The hammer, in turn, will hold point 57 of trip latch 58 out of engagement with trip bar 55, so that the lever 21 will assume an off-stem position similar to Fig. 2, but with the free end 50 disposed close to the valve body 12. When this occurs, it is necessary, before reopening of the valve is possible, to cock the mechanism by moving the lever 21 to the position shown in Fig. 2, after the end of delivery tube 23 has been raised into free air. Obviously, it is therefore impossible to accidentally or even purposely open the valve when the delivery tube is inserted into a full tank.

The tripped or closed valve condition will be as illustrated by Fig. 1. After being cocked, the valve may be opened or closed manually as with any conventional valve so long as the liquid in the tank does not cover the free end of the delivery tube. Without regard to the ultimate position assumed by the actuating lever immediately following the tripping of the main valve, the cycle of operation above set forth may be repeated indefinitely for establishing a flow of liquid to be subsequently terminated automatically by the force of air that will be compressed within the air tube 25 by the rising level of liquid in the tank undergoing replenishment.

In operating the device, it will be found that the actuating lever cannot open the main valve 13 after the tripping action has occurred, until a subsequent cocking operation has been performed either manually or automatically as above explained.

Fabrication of the various parts, and assembly thereof in the relationship herein explained, will result in achieving a fully automatic filler spout which will reliably perform the intended functions set forth in the objects specified at the head of this description. As was previously explained, the spring 67 should be of sufficient power to displace the trip bar latch 58 (Fig. 4) against the opposition of the lighter spring 60 in the free condition of the hammer, in order that the trip bar 55 may descend for cocking the hammer as illustrated by Fig. 5, without any interference from the latch shoulder or abutment 57. Upon ascending to the original position of Fig. 6, the trip bar 55 will slightly displace the latch 58 sufficiently to place the abutment 57 in engagement with the latch bar under the yielding force of latch spring 60.

By rotating the adjusting screw 87, the base 84 of the toggle anchorage element 83 may be slightly flexed for bodily shifting the end 81 of toggle element 71, thereby to establish the sensitivity with which the sear holds the hammer in cocked position. It should be appreciated that the toggle structure is likewise yieldingly urged to the fully arched position by the yielding force of the light spring 61 which acts upon the sear at all times. The force of spring 61 is sufficiently light to enable movements of the diaphragm 96 to depress and straighten the toggle structure, with resultant release of the hammer from the sear.

In constructing a device of the character described, it is considered preferable to supply the auxiliary flexible diaphragm 53 in order that air pressure may not be built up within the chamber containing the hammer and its associated parts, when the main diaphragm 96 is flexed toward spring element 94 in the normal operation of the automatic trip mechanism. As will readily be understood, a building up of pressure at the rear side of the diaphragm might possibly oppose the ability of the diaphragm to trip the toggle. In addition to the function stated, the secondary diaphragm 53 performs the added function of excluding dirt and moisture from the region of the hammer and its associated working parts. It will readily be evident that when the parts of Figs. 8, 9, 10 and 11 are mounted successively upon the housing 36 in accordance with the teaching previously explained, an air tight chamber will be established between the cap 105 and the diaphragm 96. This air tight chamber communicates directly with the secondary air tube 37 and with the primary air tube 25, through the passages indicated at 35—31—28 of Fig. 1.

It is to be understood that various modifications and changes may be made in the structural details of the device, without departing from the spirit of the invention. For example, the steps or notches 20 of the handle might be omitted if desired, and the roller 44 of the actuating lever may be replaced with a common abutment surface without detracting from the operating ability of the automatic cut-off mechanism. Moreover, it may be considered desirable to modify the main valve 13 in accordance with any well-known practice, for precluding sudden closing of the valve resulting in hammering of the liquid and ultimate injury to the hose or tube connected with the fitting 14 of the valve body. In most devices of this kind, a strainer is inserted in the delivery tube 23, and this invention contemplates provision of such a strainer when it is desirable to prevent passage of foreign matter from the delivery tube and into the tank or reservoir undergoing replenishment. When the filler spout of the invention is to be subjected to hard usage, any suitable casing or housing of the required strength and durability may be applied over the housing 36 and its air tube 37, to preclude injury to or destruction of such parts.

It may be noted that the free end 101 of the main shaft (Fig. 7) need not be supported in a bearing if the bearing boss 46 is properly designed to effectively journal the shaft. The character 102 represents a pin driven or otherwise securely fixed within a bore in the inner end of shaft 101, for fixedly mounting the trip bar 55 upon the inner end of the shaft. Details such as this might readily be modified in accordance with known manufacturing expedients, without departing from the invention herein set forth.

What is claimed is:

1. A filler spout comprising in combination, a hollow body having a valve seat and a valve normally urged to a closed position relative to said seat, an axially movable stem on said valve having a free end to be depressed for opening the valve, a valve actuating lever including a contactor end movable substantially along the valve stem axis to depress said stem, means including a rockable shaft providing a shiftable fulcrum for said lever intermediate its ends, whereby the lever may move bodily laterally away from the valve stem to dispose the contactor end of the lever to one side and out of reach of the stem, means including a latch mechanism to temporarily restrain the rockable shaft to establish a fixed position of the fulcrum, at which position the contactor end of the actuating lever remains in the path of movement of the valve stem, and means operated by a rising level of liquid, for tripping the latch mechanism and re-establishing rockability of the shaft and shiftability of the lever fulcrum for retraction of the contactor end of the lever from the path of valve closing movement of the valve stem.

2. A filler spout comprising in combination, a hollow body having a valve seat and a bodily shiftable valve normally yieldingly urged to a closed position relative to said seat, a valve actuating lever including a contactor portion movable against a portion of the valve to depress said valve to open position, means including a rockable lever-supporting shaft providing a shiftable fulcrum for said lever whereby the lever may move bodily laterally to dispose its contactor portion out of reach of the depressible valve portion, to free the valve for movement to the normal closed position, means including a latch mechanism to temporarily restrain rotation of the shaft and establish a fixed position of the lever fulcrum, at which position the contactor portion of the lever remains in the path of movement of the depressable portion of the valve, and means operated by a rising level of liquid, for tripping the latch mechanism and re-establishing rockability of the shaft and shiftability of the lever fulcrum to dispose the contactor portion out of reach of the depressible portion of the valve.

3. A filler spout comprising in combination, a hollow body having a valve seat and a valve normally urged to a closed position relative to said seat, an axially movable stem on said valve having a free end to be depressed for opening the valve, a valve actuating lever including a contactor end movable substantially along the valve stem axis to depress said stem, means providing a shiftable fulcrum for said lever intermediate its ends, whereby the lever may move bodily laterally away from the valve stem to dispose the contactor end of the lever to one side of the stem and out of reach of the stem, means including a latch mechanism to temporarily establish a fixed position of the fulcrum, at which position the contactor end of the actuating lever remains in the path of movement of the valve stem, and means operated by a rising level of liquid for tripping the latch mechanism and re-establishing shiftability of the lever fulcrum for retraction of the contactor end of the lever out of reach of the valve stem, and means operative when the lever fulcrum is fixed as stated, to hold the actuating lever with its contactor end in depressing position upon the valve stem.

4. A filler spout comprising in combination, a hollow body having a valve seat and a bodily shiftable valve normally yieldingly urged to a closed position relative to said seat, a valve actuating lever including a contactor portion movable against a portion of the valve to depress said valve to open position, a main rock shaft including means providing a shiftable fulcrum for said lever whereby the lever may move bodily laterally to dispose its contactor portion out of reach of the depressable valve portion, to free the valve for movement to the normal closed position, means including a latch mechanism associated with the main rock shaft to temporarily establish a fixed position of the shaft and the lever fulcrum, at which position the contactor portion of the lever remains in the path of movement of the depressible portion of the valve, and means operated by a rising level of liquid, for tripping the latch mechanism and releasing the shaft, for re-establishing shiftability of the lever fulcrum enabling disposition of the contactor portion of the lever out of reach of the depressible portion of the valve, and means operative when the lever fulcrum is fixed as stated, to maintain the contactor portion of the lever in depressed relationship to the valve.

5. A filler spout for the control and delivery of liquid from a source of supply to a reservoir, and comprising in combination, a hollow body having a valve seat and a valve normally urged to a closed position relative to said seat, means including a longitudinally slotted valve actuating lever to unseat said valve, a stationary bearing, a main shaft rotatably supported by said bearing and received in said lever slot, a re-settable trip means directly connected with said main shaft and operated by a rising level of liquid in the reservoir to remove the valve from the influence of said lever to permit return of the valve to a normal closed position, and means precluding re-opening of the valve by the actuating lever in advance of re-setting the trip means.

6. A filler spout for the control and delivery of liquid from a source of supply to a reservoir, and comprising in combination, a hollow body having a valve seat and a valve normally urged to a closed position relative to said seat, a valve actuating lever to unseat said valve, a stationary bearing, and a main shaft rotatably supported by said bearing, including a shiftable fulcrum means for said lever guiding the lever to alternative positions when moved, to either unseat the valve or to be ineffective for such unseating operation, a re-settable trip means associated with said shaft, and operated by a rising level of liquid in the reservoir, to control shifting of the lever fulcrum means and consequently the position of the lever with respect to the valve, said trip means including means to preclude fixation of the fulcrum means in position to guide the actuating lever to a valve unseating position in advance of re-setting the trip means.

7. A filler spout comprising in combination, a hollow body including an entry port, a delivery port, and a valve seat, a valve, a pivoted actuating lever having a handle end and a valve contactor end, said lever having intermediate its ends an elongated slot one end of which is notched, an outwardly extending fixed lug on the lever adjacent to the notch, a valve tripping mechanism including a fixed housing, a rotatable main shaft extending from the housing and into the elongated slot of the lever, and a pair of teeth on the shaft, one adapted to be received in the lever notch, while the other is in contact with the lug, latch means within the housing operated by a depressing movement of the lever to latch the main shaft against rotation while the teeth of the main shaft are engaged with the notch and the lug, a tube at the delivery port, and means operated by a compression of air in the tube to trip the latch means and free the main shaft from restraint of its rotational movement, as the handle end of the actuating lever is held in a depressed valve-opening condition.

8. A filler spout comprising in combination, a hollow body including an entry port, a delivery port, and a valve seat, a valve, a pivoted actuating lever having a handle end and a valve contactor end, said lever having intermediate its ends an elongated slot one end of which is notched, an extending fixed lug on the lever adjacent to the notch, a valve tripping mechanism including a fixed housing, a rotatable main shaft extending from the housing and into the elongated slot of the lever, and a pair of teeth on the shaft, one adapted to be received in the lever notch, while the other is in contact with the lug, latch means within the housing operated by a depressing movement of the lever to latch the main shaft against rotation while the teeth of the main shaft are engaged with the notch and the lug, a tube at the delivery port, and means operated by a compression of air in the tube to trip the latch means and free the main shaft from restraint of its rotational movement, said last mentioned means including a releasable hammer yieldingly urged into striking contact with the latch, and means to cock said hammer upon rotational movement of the main shaft in one direction.

9. A filler spout comprising in combination, a hollow body including an entry port, a delivery port, and a valve seat, a valve, a pivoted actuating lever having a handle end and a valve contactor end, said lever having intermediate its ends an elongated slot one end of which is notched, an outwardly extending fixed lug on the lever adjacent to the notch, a valve tripping mechanism including a fixed housing, a rotatable main shaft extending from the housing and into the elongated slot of the lever, and a pair of teeth on the shaft, one adapted to be received in the lever notch, while the other is in contact with the lug, latch means within the housing including a trip bar operated by rotation of the main shaft to latch the main shaft against rotation, while the teeth of the main shaft are engaged with the notch and the lug of the lever, and means operative to trip the latch means and free the main shaft from restraint of its rotational movement as the handle end of the actuating lever is held in a depressed valve-opening condition.

10. A filler spout comprising in combination, a hollow body including an entry port, a delivery port, and a valve seat, a valve, a pivoted actuating lever having a handle end and a contactor end, the latter end being adapted to force the valve to an unseated position upon pivotal movement of the lever to an operative depressed position, said lever having intermediate its ends an elongated slot, a valve tripping mechanism including a fixed housing, and a rotatable main shaft extending from the housing and into the elongated slot of the lever, complementary engageable means on the main shaft and upon the lever near one end of the slot, to establish a fulcrum for the lever, latch means within the housing operated by a depressing movement of the actuating lever to latch the main shaft against rotation while the complementary engageable means aforesaid are in engagement, a tube at the delivery port, and means operated by air compressed in the tube, to trip the latch means and free the main shaft from restraint of its rotational movement, as the handle end of the actuating lever is held in a depressed open-valve condition.

11. A filler spout comprising in combination, a hollow body including an entry port, a delivery port, and a valve seat, a valve, a pivoted actuating lever having a handle end and a contactor end, said lever having intermediate its ends an elongated slot, a valve tripping mechanism including a fixed housing and a rotatable main shaft extending from the housing and into the elongated slot of the lever, complementary engageable means on the main shaft and upon the lever near one end of the slot, to establish a fulcrum for the lever, latch means within the housing operated by a depressing movement of the actuating lever to latch the main shaft against rotation while the complementary engageable means aforesaid are in engagement, a tube at the delivery port, and means operated by air under compression in said tube, to trip the latch means and free the main shaft from restraint of its rotational movement, as the handle end of the actuating lever is held in a depressed open-valve condition, said last mentioned means including a releasable hammer yieldingly urged into striking contact with the latch, and means to cock the hammer upon rotational movement of the main shaft in one direction.

12. A filler spout comprising a hollow body including entry and delivery ports, and a yieldingly closed valve therefor, a bodily shiftable slotted lever having a contactor end to unseat said valve, a valve tripping mechanism including a housing fixed to the body and comprising a bearing, a main shaft rotatable in the bearing and extending into the elongated slot of the lever, complementary engageable fulcrum means on said shaft and lever near one end of the slot, latch means within the housing including a trip bar operated by the main shaft to latch said shaft against rotation while the complementary engageable fulcrum means are in registry, and means operative to trip the latch means and free the main shaft from restraint of rotation as the lever is held in a depressed open-valve condition.

13. A filler spout comprising a hollow body including entry and delivery ports, and a yieldingly closed valve therefor, a bodily shiftable slotted lever having a contactor end to unseat said valve, a valve tripping mechanism comprising a fixed housing having a bearing, a main shaft rotatable in the bearing and extending into the elongated slot of the lever, complementary engageable means on the main shaft and upon the lever near one end of its slot, to establish a lever fulcrum only when the main shaft is held in restraint of rotation, latch means in the housing including a trip bar operated by rotation of the main shaft to latch said shaft against rotation, while the complementary engageable means are in registry, and means operative to trip the latch means for release of the main shaft and disengagement of said complementry means, whereby the fulcrum is displaced to permit bodily shifting of the lever and its contactor end from said valve.

14. A trip assembly comprising a housing and a flexible diaphragm dividing same into two chambers, one having an opening for admitting air under slight pressure to flex the diaphragm, a resilient member in the second chamber opposing said flexing, a toggle in the second chamber breaking toward and from the diaphragm and operated by the resilient member when moved by the diaphragm, said toggle having an adjustable anchor end and an opposite end, a pivoted sear having a latch end pivotally supporting said opposite end of the toggle, a pivoted hammer including a projection to be held by the sear, a rockable main shaft extending through the housing, and a trip bar on said shaft and movable therewith to force the hammer to cocked relationship with the sear, a latch point on said bar, and a trip bar latch to engage said point for precluding trip bar movement toward the sear, means pivoting said trip bar latch for movement of an end toward the main shaft, spring means urging the sear and the trip bar latch toward each other, and spring means urging the hammer toward the trip bar latch and from the sear, with sufficient force to keep the trip bar latch out of the path of trip bar movement as long as the hammer is free of the sear, and means on the main shaft providing alternatively a fulcrum or a slide for the support of a valve actuating lever.

15. A trip assembly comprising a housing and a flexible diaphragm dividing same into two chambers, one having an opening for admitting air under slight pressure to flex the diaphragm, a resilient member in the second chamber opposing said flexing, a toggle in the second chamber breaking toward and from the diaphragm and operated by the resilient member when moved by the diaphragm, said toggle having an anchor end and an opposite end, a normally fixed support means for said anchor end, a yielding sear supporting said opposite end, means limiting movements of the toggle with the sear, a spring projected hammer held in restraint by the sear while the toggle is extended toward the diaphragm, a main shaft rockingly supported by the housing, a trip bar fixed to the shaft and movable therewith to force the hammer to cocked relationship with the sear, means to releasably latch the trip bar after cocking the hammer, and means applying pressure of air to the diaphragm, for actuating the toggle and the sear to release the hammer.

16. A trip assembly of the class described, comprising in combination a housing including a flexible diaphragm dividing the housing into two opposed chambers, one of said chambers having an opening therein for admission of air under slight pressure to flex said diaphragm, a resilient member in the second chamber opposing said flexing, a toggle structure within the second chamber arranged to break toward and from the diaphragm, and to be operated by the flexing of the resilient member when moved by the diaphragm, said toggle structure having an adjustable anchor end and an opposite end, a pivoted sear having a latch end pivotally supporting said opposite end of the toggle, a hammer pivoted for movement toward and from the sear and including a projection to be held by the sear, a rockable main shaft extending through the housing, and an elongated trip bar fixed to the inner end of the main shaft to force said hammer into a cocked relationship with the sear upon partial rotation of the main shaft, a latch point on one end of the trip bar, and a trip bar latch to engage said point for precluding movement of the trip bar in the direction of the sear, said trip bar latch being pivoted for movement of an end toward and from the main shaft, spring means for yieldingly urging the trip bar latch and the sear toward a common intermediate point, and spring means yieldingly urging the hammer away from the sear and into contact with the trip bar latch, with a force capable of maintaining said trip bar latch out of the path of movement of the trip bar as long as the hammer is free of restraint by the sear, and means on the outer end of the main shaft providing alternatively a fulcrum or a slide for the support of a valve actuating lever.

17. A trip assembly comprising in combination, a housing including a flexible diaphragm dividing the housing into two chambers, one having an opening for admission of air under pressure to flex said diaphragm, a resilient member in the second chamber opposing said flexing and tending to restore the diaphragm to a neutral position, a toggle structure in the second chamber arranged to break toward and from the diaphragm, and operated by the resilient member, said toggle structure having an anchor end and an opposite end, means supporting the anchor end pivotally upon a normally stationary part of the housing, a yieldingly movable sear supporting the opposite end of the toggle, means limiting movement of the toggle toward and from the diaphragm with corresponding movement of the sear, a spring projected hammer held in restraint by the sear when the toggle is extended toward the diaphragm, a main shaft rockingly mounted upon the housing and extending therethrough, a trip bar fixed to the inner end of the shaft and moveable therewith to force the hammer into cocked relationship with the sear, and means operative subsequently to each cocking movement of the trip bar, to releasably latch the trip bar against movement toward the hammer until the sear has been moved by the toggle for release of the hammer.

18. A trip assembly comprising in combination, a housing including a flexible diaphragm dividing the housing into two chambers, one having an opening for admission of air under slight pressure to flex said diaphragm, a resilient member in the second chamber yieldingly opposing said flexing, a toggle structure within the second chamber arranged to break toward and from the diaphragm, and operated by the resilient member upon flexing of the diaphragm, said toggle structure having a stationary anchor end and an opposite end, a yieldingly movable sear supporting the opposite end of the toggle, means limiting breaking movements of the toggle with corresponding movement of the sear, a spring projected hammer held in restraint by the sear when the toggle is extended toward the diaphragm, a main shaft rockingly mounted upon the housing and extending through to the exterior thereof, a trip bar fixed to the inner end of the shaft and moveable therewith to force the hammer into cocked relationship with the sear, means operative subsequently to each cocking movement of the trip bar, to releasably latch the trip bar against movement toward the hammer until the sear has been moved by the toggle for release of the hammer, a valve actuating lever having a handle end, and a contactor end adapted to depress a yieldingly extended valve stem, said lever having an intermediate portion including an elongated slot in which is transversely extended that portion of the main shaft which is exteriorly of the housing, and complementary engageable means on the main shaft and lever at the elongated slot, serving to provide a fixed fulcrum for the lever in the latched position of the main shaft, and to displace the fulcrum for bodily movement of the lever within limits established by the length of the slot, when the main shaft is rotated into position for cocking the hammer.

19. A filler spout comprising a hollow body including entry and delivery ports, and a yieldingly closed valve therefor, a pivoted actuating lever having a handle end, a valve contactor end, and an intermediate elongated slot one end of which is notched, and extending fixed lug near the notch, a valve tripping mechanism including a fixed housing, a rotary main shaft extending from the housing into the lever slot, a pair of teeth on the shaft, one being received in the notch, while the other contacts the lug, in a latched condition of the main shaft, latch means in the housing set by rotational movement of the main shaft and shifting of its teeth as the actuating lever is depressed, a tube at the delivery port, and means operated by compression of air in the tube, to trip the latch means and free the main shaft from restraint of its rotational movement, thereby disengaging the main shaft teeth from the notch and the lug to cause bodily shifting of the lever contactor end out of reach of the valve.

20. A filler spout comprising a hollow body including entry and delivery ports, and a yieldingly closed valve therefor, a pivoted actuating lever having a handle end, a valve contactor end, and an intermediate elongated slot one end of which is notched, an extending fixed lug near the notch, a valve tripping mechanism including a fixed housing, a rotary main shaft extending from the housing into the lever slot, a pair of teeth on the shaft, one being received in the notch, while the other contacts the lug, in a latched condition of the main shaft, latch means in the housing set by rotational movement of the main shaft and shifting of its teeth as the actuating lever is depressed, a tube at the delivery port, and means operated by compression of air in the tube, to trip the latch means and free the main shaft from restraint of its rotational movement, thereby disengaging the main shaft teeth from the notch and the lug to cause bodily shifting of the lever contactor end out of reach of the valve, said last mentioned means comprising a releasable hammer yieldingly urged into striking and tripping contact with the latch means.

AMOS O. PAYNE.